Oct. 6, 1931.  V. G. APPLE  1,826,296
DYNAMO ELECTRIC MACHINE MEMBER
Filed June 14, 1928   3 Sheets-Sheet 1
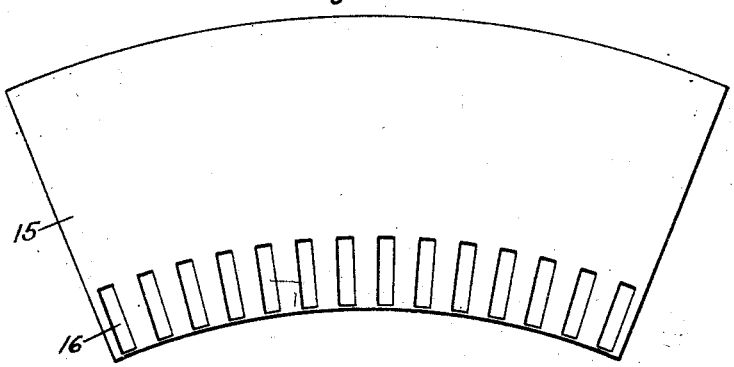
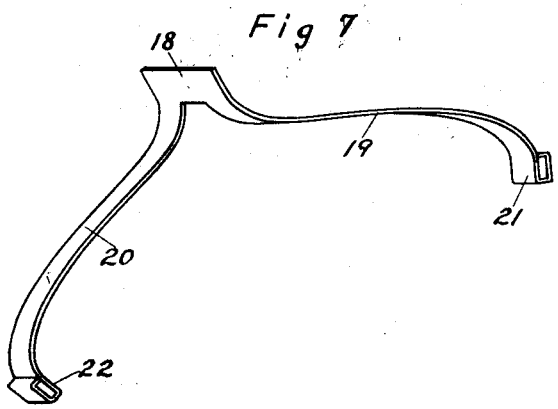
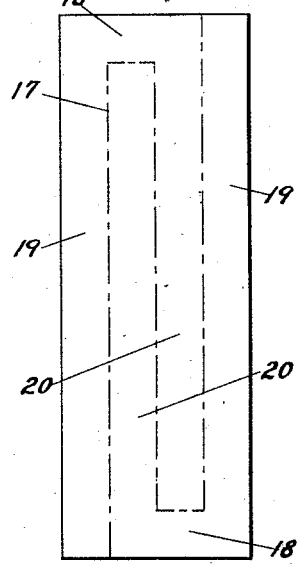
INVENTOR.
Vincent G. Apple Oct. 6, 1931.  V. G. APPLE  1,826,296

DYNAMO ELECTRIC MACHINE MEMBER

Filed June 14, 1928   3 Sheets-Sheet 2

INVENTOR.
Vincent G. Apple

Oct. 6, 1931.  V. G. APPLE  1,826,296
DYNAMO ELECTRIC MACHINE MEMBER
Filed June 14, 1928  3 Sheets-Sheet 3

INVENTOR.
Vincent G. Apple

Patented Oct. 6, 1931

1,826,296

UNITED STATES PATENT OFFICE

VINCENT G. APPLE, OF DAYTON, OHIO

DYNAMO ELECTRIC MACHINE MEMBER

Application filed June 14, 1923. Serial No. 285,363.

My invention relates broadly to that class of dynamo electric machine members known as "bar wound" and is more specifically applicable to members whereof the core apertures are of the closed or semi-closed type thru which the bars composing the winding may be entered endwise only.

One object of my invention is to gain electrical and mechanical advantages by providing a structure wherein insulation of great dielectric value disposed between parts which so require serves also to securely bind together and unify the various parts composing the member.

Another object is to provide insulation that will withstand a higher operating temperature than used in structures built by present methods.

Another object is to effect economy in time and material by providing a suitable machine and a method of procedure for carrying my improvement into effect to the end that the finished product may be more durable and dependable yet of less cost than when made by present methods.

Other objects will be apparent to those skilled in the art as the invention is described in detail and reference is made to the drawings wherein—

Fig. 1 shows a straight laminated bar such as I use as one of the conductors of my winding.

Fig. 2 is an end view of the bar shown in Fig. 1.

Fig. 3 shows the bar Fig. 1 after a coating of insulating material has been applied to the greater part of its surface.

Fig. 4 is an end view of the bar shown in Fig. 3.

Fig. 5 shows one of a plurality of segments of which my core is made.

Fig. 6 shows how a rectangular sheet of conductive material may be divided to provide two end connecting portions of my winding.

Fig. 7 is a view in perspective of an end connecting portion after bending to form.

Similar numerals refer to similar parts throughout the several views.

Figure 8:
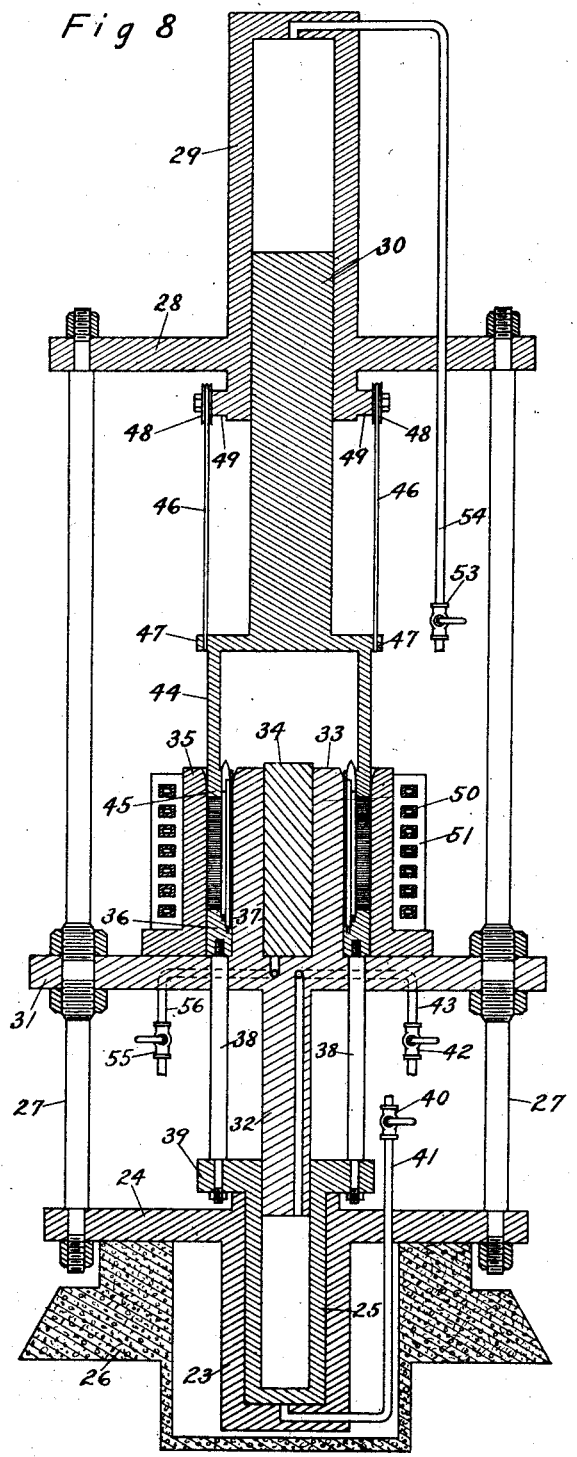
Fig. 8 is a vertical cross section thru a machine which I use for carrying my method into effect.

As one embodiment of my invention I illustrate as a dynamo electric machine member an alternating current stator of relatively large proportions such as may be used as part of turbo-generator or synchronous motor.

To carry out my method I first provide a plurality of conducting elements of laminar structure as shown in Figs. 1 and 2 where numerals 10, 10 etc. represent the several laminæ comprising one conducting element. Relatively thin strips of insulating material 11, 11 etc. may space the several laminæ of a conductor.

The conductors are next covered to a point near their ends with a relatively thick layer of insulating material which may be applied by wrapping thereabout sheets of asbestos paper, a cloth, or the like, saturated with, or otherwise carrying, an insulating compound. The insulating compound may preferably consist of a mixture of synthetic resin, iron free silica sand, lime and a flux such as feldspar, fluorspar or soda ash and may be applied of considerable greater thickness and length than required in its finished form. The conductors so covered may then be placed in a die to which just enough pressure and heat is applied to bring about the reaction of the synthetic resins, and when removed from the die the covering is sufficiently hard, smooth, and accurate for further steps in the process.

A conductor so treated and removed from the die is shown at 12 Figs. 3 and 4 where 13 is the covering of insulation surrounding the laminæ 10, 10 etc. of the conductor and 14 and 14 the ends which are left uncovered to facilitate subsequent connection to form a winding.

In conformity with present practice I use as a core for my stator a plurality of segmental sheet stampings as shown at 15 Fig. 5, a series of such segments composing a layer and a sufficient number of layers the core. Perforations 16 are of a size and form which may contain two covered conductors Fig. 3 placed edge to edge. Perforations shown are known as of the closed type. The stampings may be coated or not as desired but when coated the insulating compound used may preferably be of the same nature as that used on the conductors.

The end connecting portions of the winding are provided by cutting apart rectangular sheets as in Fig. 6 on the broken line 17 to divide each sheet into two U shaped parts 18 each having a long leg 19 and a shorter leg 20, and bending them to the form shown in Fig. 7 the ends being bent as at 21 and 22 to surround ends 14 of the conductor bars, end 22 of short leg 20 being adapted to connect to a bar of the outer layer and end 21 of long leg 19 being adapted to connect to a more or less widely spaced apart bar of the inner layer to provide winding turns. Instead of bending the ends as at 21 and 22 they may be left straight and joined to the conductors in any manner desired.

Having provided sufficient parts I next proceed to assemble conductors 12 and segmented stampings 15, and to facilitate their assembly I provide a press such as I show in the vertical cross section Fig. 8 where—

A hydraulic cylinder 23 having a wide flange 24 and containing a hollow ram 25 is supported on concrete base 26. Extending vertically from flange 24 are columns 27 and supported on the upper end thereof by wide flange 28 is a hydraulic cylinder 29 containing ram 30. Intermediate of flanges 24 and 28 and supported by columns 27 is another flange 31 having a downwardly extending cylindrical portion 32 and an upwardly extending cylindrical portion 33, the portion 32 being fitted to a bore in ram 25 and the portion 33 being of outside diameter equal to the bore of the stator being assembled, and of inside diameter suitable to receive another ram 34. Concentric with portion 33 and mounted on flange 31 is a cylindrical part 35 having an inside diameter equal to the outside diameter of the stator to be assembled. In space between portion 33 and part 35 is a cylindrical ring 36 the outside and inside diameters of which are equal to those of the stator to be assembled. The upper side of ring 36 contains a series of pockets 37 equal in number to the apertures 16 of the core to be assembled, a pocket 37 being of such size that conductors paired edge to edge as in Fig. 9 may have the ends 14, 14 entered therein and a portion of the insulated part 13, 13 as well, the depth of the pockets being such that the portion of the conductors which are to extend beyond the core will be entirely contained in the pockets. Fastened to and extending downwardly from ring 36 thru openings in flange 31, rods 38 connect to flange 39 of ram 25 so that when valve 40 admits fluid under pressure thru pipe 41, ring 36 is moved upwardly by ram 25 thru rods 38 and when valve 42 admits fluid under pressure thru pipe 43, ring 36 is returned downwardly by ram 25 thru rods 38.

At the lower end of ram 30 is a cup shaped portion 44 flanged inwardly at the bottom end as at 45 the flange having thru-perforations of a number and size corresponding to the apertures 16 of the core being assembled. Cables 46 fastened to lugs 47 and passing over sleeves 48 supported by lugs 49 of cylinder 29 connect to a motor hoist not shown by means of which flange 45 may be rapidly raised or lowered when no hydraulic effect is being applied to ram 30. A high frequency coil 50 made of rectangular copper tubing surrounds part 35 for the purpose of generating heat in the metal masses within by eddy current effect so that the mold and product becomes in effect a high frequency induction furnace. Insulation 51 serves to confine the heat and prevent short circuits between the coils.

Figure 9:
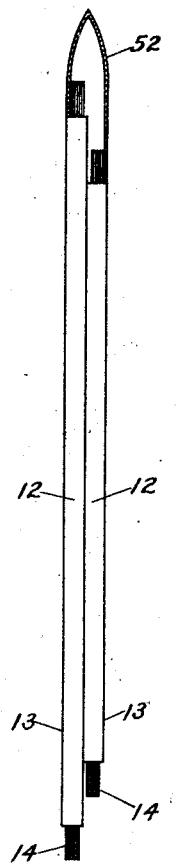
Fig. 9 shows a pair of conductors placed edge to edge in similar relation to that occupied when assembled with the core and a cap covering the one end of the pair to facilitate entry thereof in the core apertures.
Figure 10:
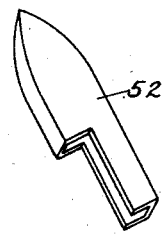
Fig. 10 is a perspective view more clearly illustrating the cap shown in Fig. 9.

To carry forward my method by means of the above described press I first raise cup 44 well above the top of part 35 then I stand vertically in each pocket 37 of ring 36 a pair of conductors assembled edge to edge as shown in Fig. 9, each pair comprising one long inner layer conductor and a relatively shorter outer layer conductor, and placing on the upper end of each pair a spear-shaped cap 52. The cap 52 is separately and more clearly shown in Fig. 10. I now place sufficient stampings 15, for one layer of the core over caps 52, then sufficient stampings for another layer over caps 52 in such a way that the joints between successive stampings of one layer will be intermediate the joints of the other layer. After a number of layers have been so placed over the caps 52 the cup 44 may be rapidly let down by the motor hoist until the perforated flange 45 drives the stampings downward over the conductors 12 against ring 36 when the cup may be returned to its upper limit of travel and more stampings threaded on. This process is repeated until sufficient stampings have been placed to complete the core. The cup 44 is then brought down against the stampings and valve 53 is opened allowing liquid under pressure to flow thru pipe 54 into hydraulic cylinder 29 and acting thru ram 30 against cup 44 applying great pressure to the assembled structure. High frequency current is then turned into coil 50 to heat the structure under pressure and if the stampings have been coated the heat thus generated fluxes the insulating compound between them and the maintained pressure on cup 44 evenly distributes the insulating material between them forcing the excess material into the minute spaces between the conductors and core apertures so that the conductors will be so firmly bound in the core as to effectively prevent any subsequent shifting of their relative positions.

Since any mixture applied to the stampings should be of a similar material to that previously applied to the conductors the gradually rising heat first brings about the reaction of the synthetic resins bringing the mixture on the stampings to a state equal to that on the conductors but as a considerably higher heat is obtainable with the high frequency coil and as the mixture as previously stated may contain also iron free silica sand, lime feldspar, fluorspar, soda ash or other flux the heat is carried higher and the synthetic resins are converted to carbon which as the vitrifying state of the mixture is reached combines with the silica forming silica-carbide as the insulating material. The lime content may be in such proportion as will, by its effect of causing expansion of the mixture as it reaches its final state, assist in binding the conductors tightly in the core apertures, and the flux in such proportion as is needed to control the vitrifying temperature.

While I have herein suggested for insulation one mixture suitable to my process any other mixture may be used which may be brought to a vitreous state by a degree of heat lower than that which would permanently injure the copper in the conductors.

After the insulating compound has been brought to the desired state the current in coil 50 is shut off and valve 53 is closed, the liquid in cylinder 29 bypassed and valve 55 opened so that liquid admitted thru pipe 56 acts hydraulically against ram 34 raising same until it carries with it cup 44 thus stripping flanged end 45 from the ends of the conductors. After flange 45 has been stripped from the conductors ram 34 is returned and the motor hoist is employed to return cup 44 to its upper position. Valve 40 is next opened so that ram 25 thru rods 38 raises ring 36 to strip the core from the die. In order to loosen the ends of the conductors from the pockets 37 of ring 36 the core is first raised a short distance only by ram 25. By then opening valve 42 ram 25 is returned thus stripping pockets 37 from the ends of the conductors. By repeating this operation several times the ends will be loose enough in the pockets so that when the core is raised clear of the die it may be held by other means and the ring 36 returned to its lower position.

Figure 11:
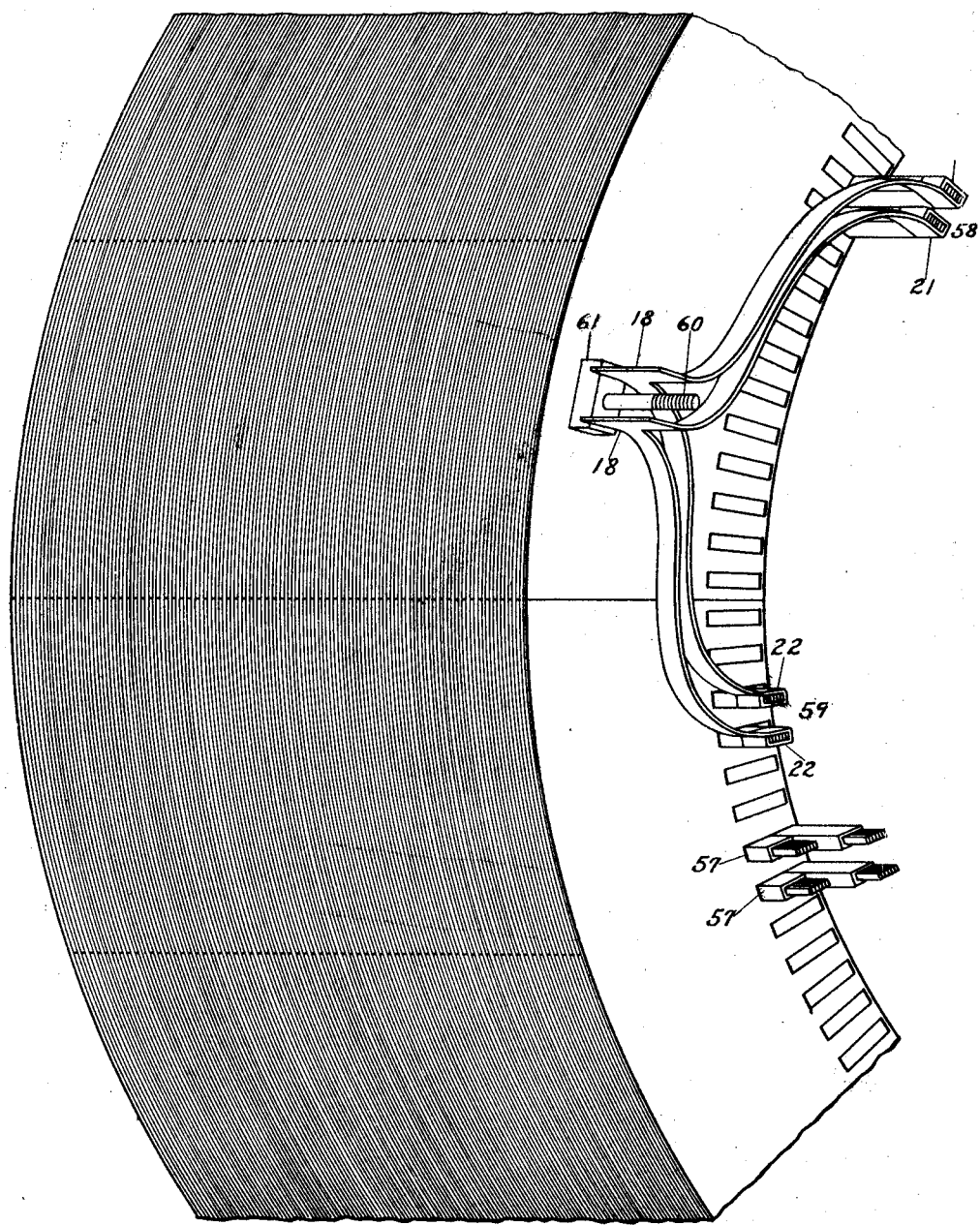
Fig. 11 is a partial view of a finished member from which most of the conductors have been omitted for clearness of illustration.

After the assembled core and conductor structure is removed from the press I proceed to join the ends of the conductors by means of connectors 18 and in Fig. 11 I show a portion of a core wherefrom for clearness the greater part of the conductors are removed, a pair of conductors as at 57 being typical of the pairs extending from each slot of a core. At 58 are conductors of the inner layer and at 59 conductors of the outer layer to which ends 21 and 22 of connectors 18 are attached being brazed, welded or otherwise joined to make good electrical connection. Studs 60 may extend from the core thru insulators 61 and by placing a similar insulator and a nut at the outer end of the stud the connectors may be braced against the short circuit stresses frequently encountered in stators of this type. The method of attaching the two end connectors shown is typical of the entire set.

While in the foregoing I have shown and described one embodiment of my invention I do not wish to limit myself strictly to the structure disclosed as the method may be used in building rotating members of dynamo electric machines as well as to stators as indicated. And while I have shown conductors of laminar structure, solid conductors may also be used and while in the drawings I show one form of end connector, other forms of end connectors may be used or the conductor bars may be extended to such a degree that they may be bent and joined so as to form end connectors thereof, and while I show laminæ for my core having closed apertures, semi-closed apertures or open slots may be used.

Such other variations in the details of the structure and the method employed as do not depart from the spirit of my invention I aim to cover in the following wherein I claim—

1. The combination in a dynamo electric machine member of a core, conducting elements, and vitreous insulating material electrically separating the conducting elements from the core and mechanically binding the various parts together.

2. Steps in the method of making a dynamo electric machine member, which consists of coating the conductors with an insulating compound, susceptible of vitrification assembling the conductors into the winding apertures of the core laminæ and applying intense heat thereto thus vitrifying the compound in situ.

3. Steps in the method of making a dynamo electric machine member, which consists of coating the conductors and core laminæ with an insulating compound susceptible of vitrification, assembling the conductors into the winding apertures of the coated core laminæ and appling intense heat thereto thus vitrifying the compound in situ.

4. Steps in the method of making a dynamo electric machine member, which consists of coating the conductors with an insulating compound susceptible of vitrification, compacting the compound in a die, assembling the conductors into the winding apertures of the core laminæ and applying intense heat thereto thus vitrifying the compound in situ.

5. Steps in the method of making a dynamo electric machine member, which consists of coating the conductors and core laminæ with an insulating compound susceptible of vitrification, compacting the compound on the conductors in a die, assembling the conductors into the winding apertures of the coated core laminæ and applying intense heat thereto thus vitrifying the compound in situ.

6. Steps in the method of making a dynamo electric machine member, which consists of coating the conductors with an insulating compound susceptible of vitrification, placing them in a die and by heat and pressure bringing about a reaction of a portion of the constituents of the compound and making the coating sufficiently hard, smooth and accurate in dimensions to facilitate the assembly of the core laminæ thereon, assembling the coated conductors into the winding apertures of the core laminæ and applying sufficient heat to the assembled structure to vitrify the compound.

7. Steps in the method of making a dynamo electric machine member, which consists of coating the conductors and core laminæ with an insulating compound susceptible of vitrification, placing the conductors in a die and by heat and pressure bringing about a reaction of a portion of the constituents of the compound and making the coating of the conductors sufficiently hard, smooth, and accurate in dimensions to facilitate assembly of the core laminæ thereon, assembling the coated conductors into the winding apertures of the core laminæ and applying sufficient heat to the assembled structure to vitrify the compound.

8. Steps in the method of making a dynamo electric machine member, which consists of coating the conductors with an insulating compound susceptible of vitrification, compacting the compound about the conductors in a die, arranging a plurality of the covered conductors in cylindrical formation in another die, assembling the core laminæ over the conductors, compacting the core laminæ, and heating the structure while confined in the die to vitrify the compound.

9. Steps in the method of making a dynamo electric machine member, which consists of coating the conductors and core laminæ with an insulating compound susceptible of vitrification, compacting the compound about the conductors in a die, arranging a plurality of the covered conductors in cylindrical formation in another die, assembling the coated core laminæ over the conductors, compacting the coated core laminæ, and heating the structure while confined in the die to vitrify the compound.

10. Steps in the method of making a dynamo electric machine member, which consists of coating the conductors with an insulating compound susceptible of vitrification, compacting the compound about the conductors in a die, arranging a plurality of the covered conductors in cylindrical formation within another die, assembling the core laminæ over the conductors, compacting the core laminæ, and heating the structure while confined in the die, by means of a high frequency coil surrounding same, to a point where the compound is vitrified.

11. Steps in the method of making a dynamo electric machine member, which consists of coating the conductors and core laminæ with an insulating compound susceptible of vitrification, compacting the compound about the conductors in a die, arranging a plurality of the covered conductors in cylindrical formation within another die, assembling the coated core laminæ over the conductors, compacting the coated core laminæ, and heating the structure while confined in the die, by means of a high frequency coil surrounding the same, to a point where the compound is vitrified.

12. Steps in the method of making a dynamo electric machine member, which consists of molding a cover of insulating compound susceptible of vitrification about the conductors, arranging a plurality of covered conductors in cylindrical formation within a die, placing spear shaped caps on the ends of the conductors to facilitate starting the core laminæ thereon, placing the core laminæ over the conductors, compacting the core laminæ, and heating the structure while confined in the die, by means of a high frequency coil surrounding the same, to a point where the compound is vitrified.

13. Steps in the method of making a dynamo electric machine member, which consists of molding a cover of insulating compound susceptible of vitrification about the conductors and coating the core laminæ with the same compound, arranging a plurality of the covered conductors in cylindrical formation within a die, placing spear shaped caps on the ends of the conductors to facilitate starting the core laminæ thereon, placing the coated core laminæ over the conductors, compacting the coated core laminæ, and heating the structure while confined in the die, by means of a high frequency coil surrounding the same, to a point where the compound is vitrified.

14. The combination, in a dynamo electric machine member, of a laminated core, conducting elements in the winding apertures of said core and a substantially continuous mass of vitreous insulation extending about the conductors to insulate them from the laminæ and outwardly away from the conductors between the laminæ.

15. Steps in the making of a dynamo electric machine member, which consists of surrounding the individual conductors with a layer of insulating compound susceptible of vitrification, compacting and drying the coverings, assembling the conductors in the apertures of the core laminæ within a high frequency coil, compacting the laminæ, and passing current through said coil to vitrify said compound while said laminæ are held in said compacted state.

16. Steps in the method of making a dynamo electric machine member, which consists of surrounding each conductor with a layer of plastic material, susceptible of vitrification, drying said layer by baking at a relatively low temperature, arranging a plurality of said conductors in cylindrical formation within a high frequency coil, placing a plurality of core laminæ over said conductors, compacting said conductors and passing a high frequency current through said coil to vitrify said material.

17. Steps in the method of making a dynamo electric machine member, which consists of covering the conductors and the laminæ with layers of insulating compound susceptible of vitrification at high heat, drying said layers by baking at relatively low heat, arranging a plurality of the covered conductors in cylindrical formation within a high frequency coil, placing a plurality of the covered laminæ over the conductors, compacting the laminæ, and passing a high frequency current through the coils to bring the laminæ and conductors to a high heat sufficient to unite and vitrify the layers of the said compound.

In testimony whereof I hereunto set my hand.

VINCENT G. APPLE.